Case I.

9 Sheets--Sheet 1.

No. 4,646.

Reissued Nov. 28, 1871.

M. Gally's

Improvement in

Printing-Presses.

Witnesses.

H. G. Hamilton

L. C. McNeal

Inventor.

Merritt Gally

Rochester

N. Y.

Case I.

9 Sheets--Sheet 2.

No. 4,646.

Reissued Nov. 28, 1871.

M. Gally's

Improvement in

Printing-Presses.

Witnesses.

H. G. Hamilton

L. C. McNeal

Inventor.

Merritt Gally,

Rochester,

N. Y.

(117.) Case I.

9 Sheets--Sheet 3.

No. 4,646. M. Gally's

Reissued Nov. 28, 1871.

Improvement in Printing Presses.

Roller levers &c., Enlarged.

Witnesses.

H. G. Hamilton

L. C. McNeal

Inventor.

Merritt Gally,

Rochester,

N. Y.

Case I.
9 Sheets--Sheet 4.
No. 4,646. M. Gally's Reissued Nov. 28, 1871.
Improvement in
Printing-Presses.
Cam &c., Enlarged.
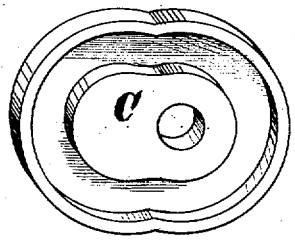
Fig. 4.
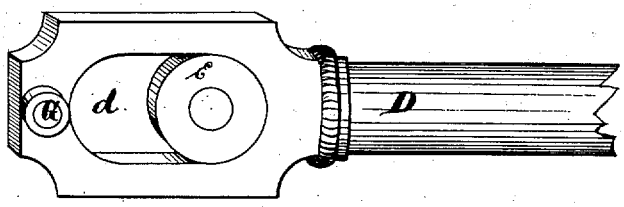
Witnesses.
H. G. Hamilton
L. C. McNeal
Inventor.
Merritt Gally,
Rochester,
N. Y.

Case I.

9 Sheets--Sheet 5.

No. 4,646. M. McGally's Reissued Nov. 28, 1871.

Improvement in

Printing-Presses.

Witnesses.

H. G. Hamilton

L. C. McNeal

Inventor.

Morritt Gally,

Rochester,

N. Y.

Case I.

9 Sheets--Sheet 6.

No. 4,646.

Reissued Nov. 28, 1871.

M. Gally's Improvement in Printing-Presses.

Witnesses.

H. G. Hamilton

L. C. McNeal

Inventor.

Merritt Gally,

Rochester,

N. Y.

Case I.
9 Sheets--Sheet 7.
No. 4,646. M. Gally's Reissued Nov. 28, 1871.
Improvement in
Printing - Presses.
Impression Adjuster
Enlarged.
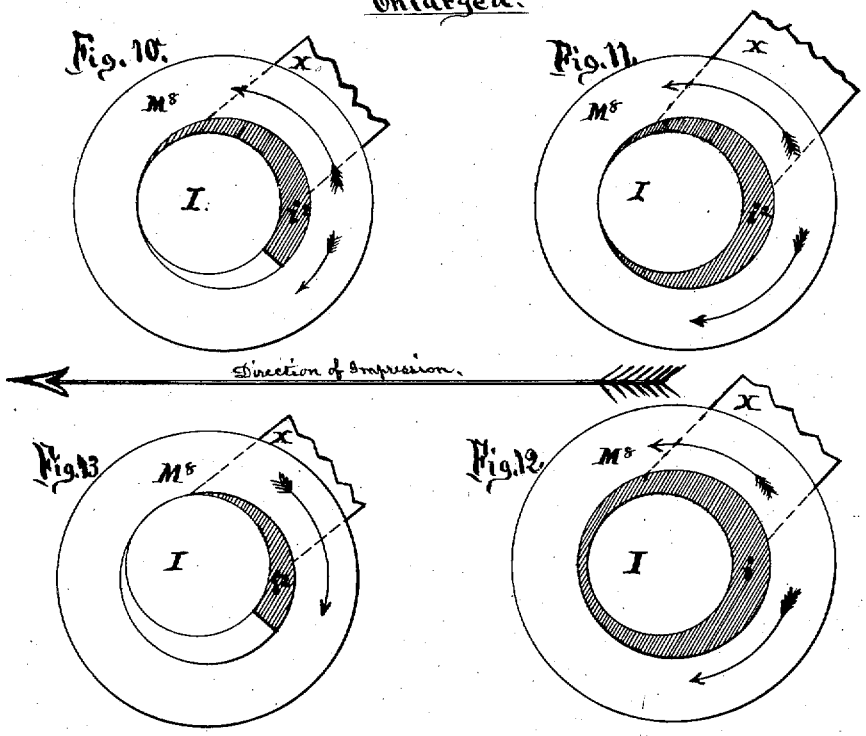
Witnesses.
H. G. Hamilton
L. C. McNeal
Inventor.
Merrill Gally.
Rochester
N. Y.

Case I.

9 Sheets--Sheet 8.

No. 4,646. M. Gally's Reissued Nov. 28, 1871.

Improvement in Printing-Presses.

Witnesses.

H. G. Hamilton

L. C. McNeal

Inventor.

Merritt Gally,

Rochester,

N. Y.

Case I.

9 Sheets--Sheet 9.

No. 4,646. M. Gally

Reissued Nov. 28, 1871.

Improvement in Printing-Presses.

Witnesses.

H. G. Hamilton

L. C. McNeal

Inventor.

Merritt Gally,

Rochester,

N. Y.

UNITED STATES PATENT OFFICE.

MERRITT GALLY, OF ROCHESTER, NEW YORK.

IMPROVEMENT IN PRINTING-PRESSES.

Specification forming part of Letters Patent No. 97,185, dated November 23, 1869; reissue No. 4,646, dated November 28, 1871.

*To all whom it may concern:*

Be it known that I, MERRITT GALLY, of Rochester, in the county of Monroe and State of New York, have invented a new and useful Improvement in Printing-Presses; and I do hereby declare that the following is a full, clear, and exact description of the construction and operation of the same, reference being had to the accompanying drawing making a part of this specification, in which—

Figure 1:
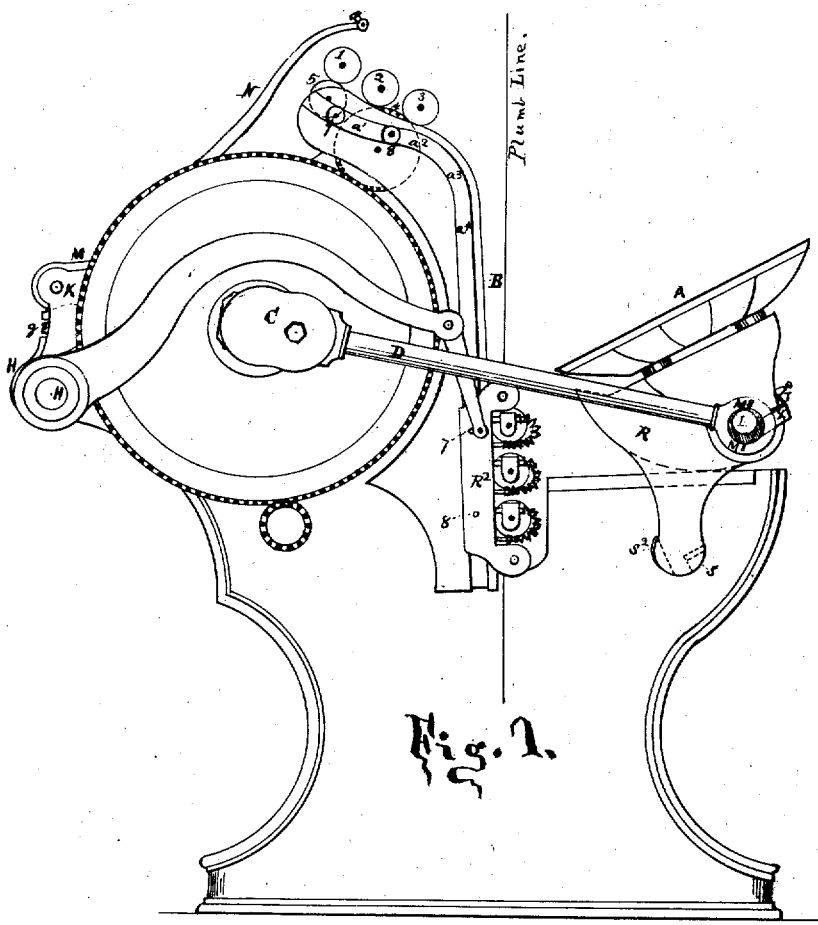
Figure 2:
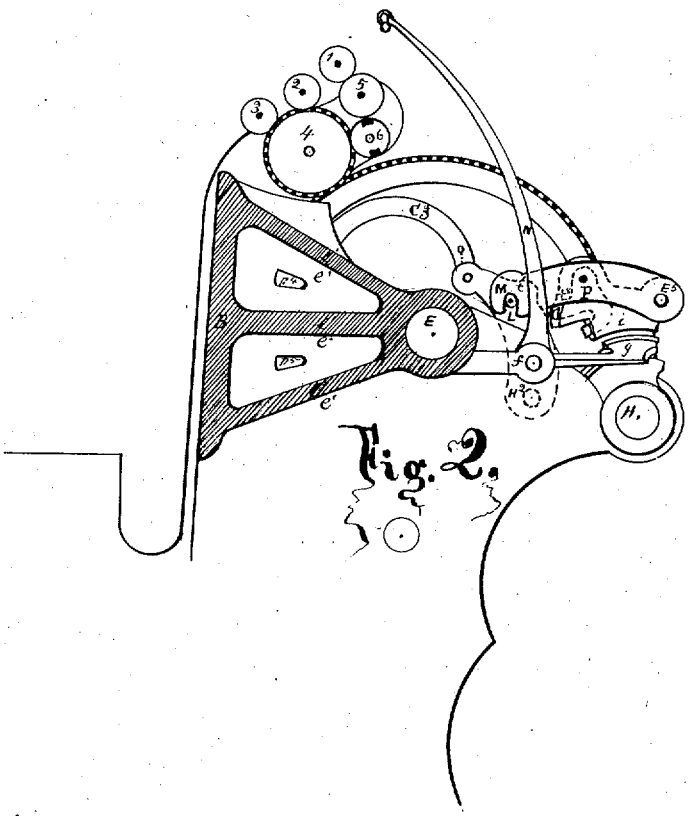
Figure 3:
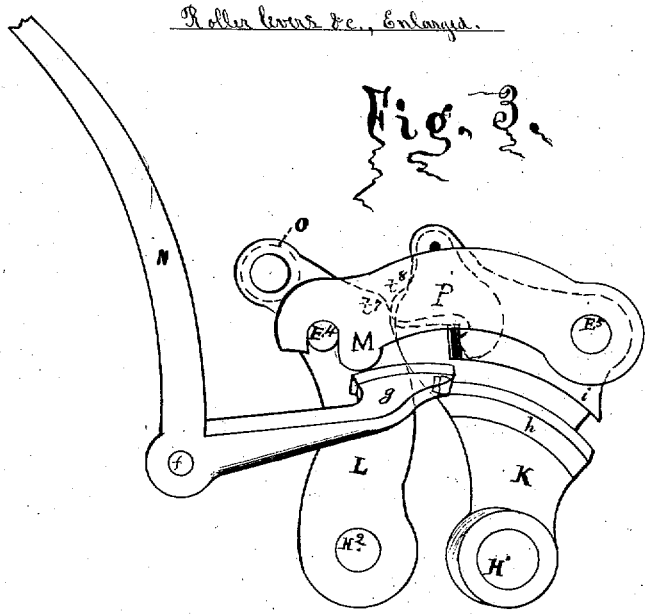
Figure 5:
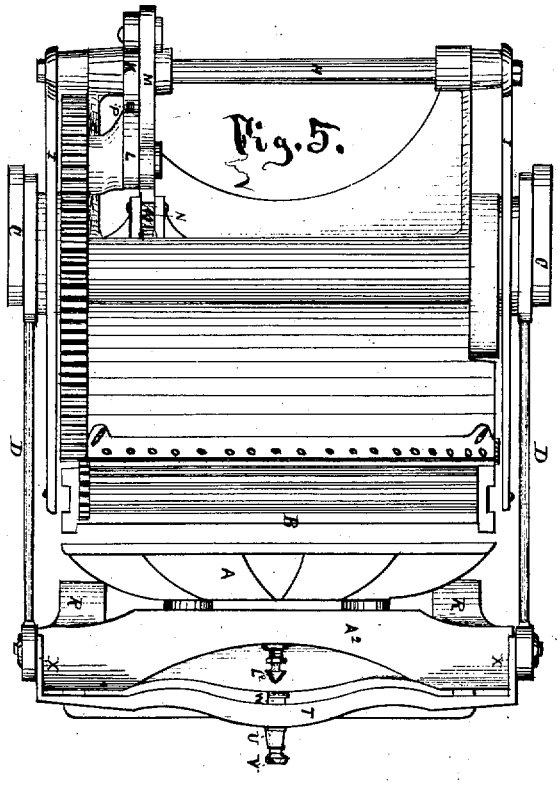
Figure 6:
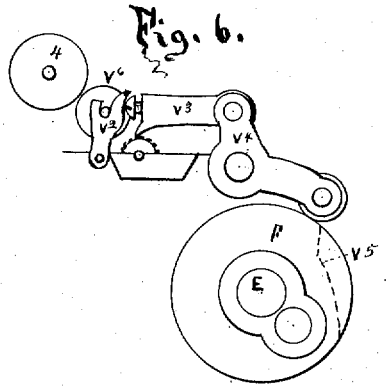
Figure 7:
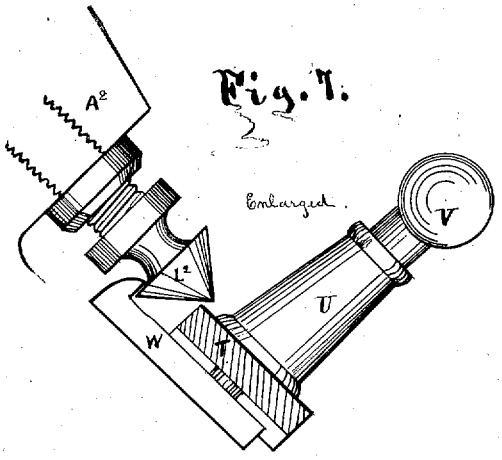
Figure 9:
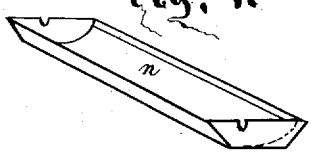
Figure 8:
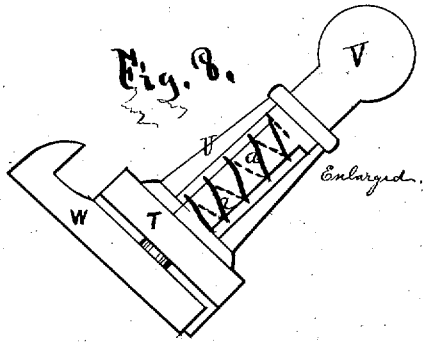
Figure 14:
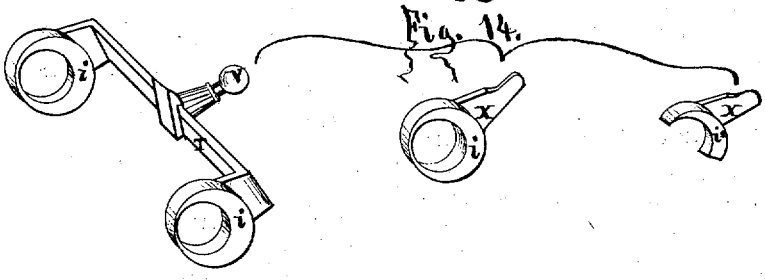
Figure 15:
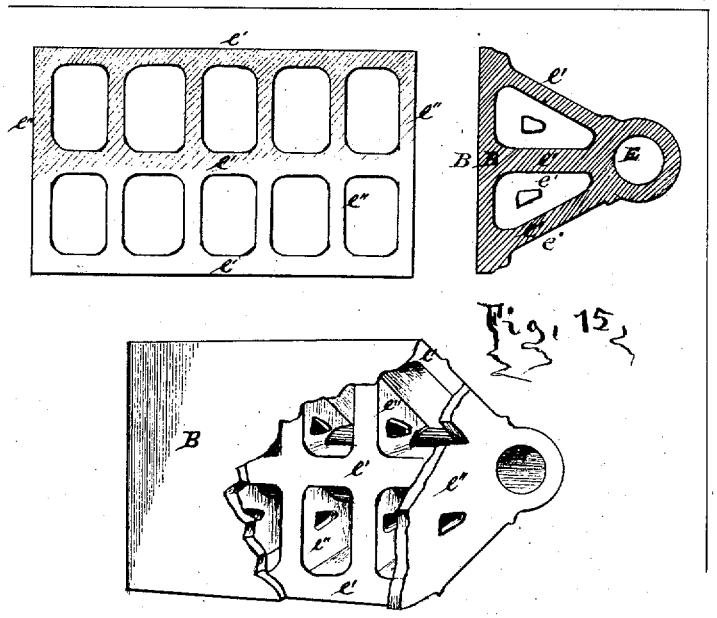
Figure 16:
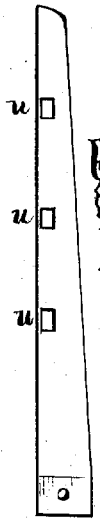

Figure 1 is a side elevation, showing the construction and relative arrangement of the ways and pulleys or guides which give direction to the roller-carriage. Fig. 2 is a longitudinal vertical section, showing the construction of the type-bed, arrangement of distributing-cylinders, and combination of levers used for giving motion to the inking-rollers. Fig. 3 is a view in perspective of the method of detachment of the same. Fig. 4 is a detached view of a portion of the draw-bar, together with the cap-cam, reversed. Fig. 5 is a horizontal section of the entire press, showing all the parts. Fig. 6 is a side elevation, showing the method of working the ink-fountain and vibrating feed-roller by one and the same movement. Fig. 7 is a perspective view of the set-latch for regulating the impression-adjuster. Fig. 8 is a longitudinal section of the same. Fig. 9 is a perspective of ink-fountain, tank, or shell, coated or lined with porcelain. Figs. 10, 11, 12, and 13 are end elevations of the impression-adjuster and throw-off. Fig. 14 is a perspective view of the impression-adjuster, showing the single wedge or sleeve with projection; also when two wedges or sleeves are connected by a bar. Fig. 15 is a longitudinal and transverse view of the partitions of the chambered shell forming the type-bed; also a perspective of the same with a part of the face of the bed cut away, showing the internal construction. Fig. 16 is a view of the griper or frisket-finger, perforated for the use of guides; and Fig. 17, a view of the elastic cut-off for ink-fountains. Fig. 18 is a cross-section of Fig. 17 on an enlarged scale.

This invention consists: First, in an improved construction of the ways which guide the movement of the inking-rollers, said ways bearing such relation to the ink-distributing cylinders as to insure an easy movement to said rollers, and, at the same time, raise them free from the distributing-cylinders on coming in contact with or leaving the same, and thus avoid the tearing of rollers, so frequent in presses where the former are drawn over the distributing-cylinders; second, in the construction and use of cams which govern the movements of the draw-bars, in connection with the driving-cranks; third, in a mechanism for imparting to the inking-rollers a positive motion in both directions over the form, in combination with a mechanism for stopping the inking-rollers, at the will of the operator, without stopping the press; fourth, in a mechanism for stopping the inking-rollers, combined with a mechanism for preventing the inking-rollers from being set in motion at an improper time; fifth, in a curved wedge or sleeve, placed between the movable bearings which sustain the force of the impression, said wedge or sleeve being so arranged that it may be set in different positions to produce varying degrees of impression, or, in other words, to operate as an impression-adjuster; sixth, in a set-latch for adjusting the degree of the impression, in connection with the curved wedges or sleeves above referred to; seventh, in springs, India-rubber packing, or other elastic material, to take off the positive pressure of the ink-fountain set-screws, so as to prevent the binding of the gauge or cut-off upon the surface of the roller which feeds the ink from the trough or tank; eighth, in placing on the lever-projection of the platen-rocker a lug, which, in connection with a flange or stop on the frame-work, holds the platen in position during the impression; ninth, in giving the type-bed a backward inclination, when used with a rocking, rolling, vibrating, or oscillating platen, for the purpose of fastening the form to the face of the bed by its own gravity, preventing loose type from working out and the form "bagging;" tenth, in a hollow bed, constructed with chambers formed by internal partitions; eleventh, in a frisket-finger, provided with a hole or holes made large enough for small feed-guides to be placed under them on the tympan-sheet, that part of the finger at the side of the hole nearest the printed matter being made very narrow, so that the guide may be used on a very narrow margin, at the same time allowing the finger to gripe the entire edge of the sheet.

In the drawing, the way $a^1$ $a^2$ $a^3$ $a^4$, which governs the direction of the rollers 1 2 3, has a straight part, in line with the face of the types, and a series of curves at that part nearest the ink-distributing cylinder or cylinders. This series of curves may be varied for different numbers of inking-rollers. In Fig. 1 three inking-rollers are represented, 1 2 3, as resting upon the distributing-cylinders 4 5. The direction of movement of the wheels or guides 7 8 determines the direction of the inking-rollers as they leave and approach the distributing-cylinders. Roller 1 simply comes in contact with cylinder 5 and leaves it directly, passing toward cylinder 4. At the same time the rollers 2 and 3 are lifted off from cylinder 4 without being drawn over its surface. This is done by the movement of the wheels or guides 8 into the curve $a^2$. As roller 1 nears cylinder 4 it also is raised clear of said cylinder by the passage of wheels or guides 7 into curve $a^2$. The wheels or guides 7 and 8 then both pass through curve $a^3$ into the straight part $a^4$.

It will be seen that the passage of the wheels or guides 7 8 through the series of curves $a^1$ $a^2$ $a^3$ into the straight way $a^4$ will give an easy undulating motion to the rollers, and, at the same time, will prevent the composition of the rollers 1 2 3 from being torn, as it is liable to be when said rollers are drawn over the surfaces of the cylinders in the usual manner. It will also be seen that this arrangement so removes the inking-rollers and distributing-cylinders from the plane of the face of the types as to allow the printing of sheets larger than the face of the platen, or with margins extending beyond the face of the platen, and thus prevents the contact of said sheets with the ink upon said rollers and cylinders.

In Fig. 4 the traverse-cam C, in connection with stud or wheel G, governs the movement of draw bar D while the crank-pin *e* is passing through the slot *d*. During a part of the sweep of the crank-pin *e* it acts in unison with the stud or wheel G, that part of the traverse through which the stud or wheel is passing being concentric with the crank-pin. The remainder of the traverse, being eccentric to the crank-pin, allows the said movement of the latter in the slot *d*, at the same time holding the draw-bar quiet, so as to impart a time of perfect rest to the plate A. The traverse may either be a cap, as represented, to be attached to the crank-pin outside of the draw-bar, or it may form part of the crank-wheel inside of the draw-bar.

The combination of levers for giving motion to the inking-rollers is arranged as follows: H, Figs. 1 and 2, is a shaft, to which roller-arms I, Fig. 1, are attached, through which, by any means of connection, motion is given to the inking-rollers of a press. To shaft H I attach a lever, K, which may be entirely separated from the roller-arms or levers above mentioned, or may form part of one of them. I also pivot another lever, L, at $H^2$, Figs. 2 and 3, said lever having a positive vibrating motion at the time for moving the inking-rollers over the types and back again to their position on the distributing-cylinders, such positive motion being imparted by a stud or wheel, O, working in positive transverse cam $C^3$ of the main spur-wheel F, to which transverse cam motion is communicated by the drawing-shaft E. I connect the levers L and K by means of a hook-connection, M, pivoted to lever K at $E^5$, and hooked upon a stud or pin, $E^4$, attached to lever L.

It will be seen that, when levers L and K are in the position shown in Fig. 3, by raising the hook M from the stud $E^4$ the lever L will be allowed its positive movement without motion of the lever K, and whenever the hook M is hooked upon the stud $E^4$ both levers, L and K, will have a positive motion, acting as a connected compound lever. As lever L acts through the shaft H, to which the roller-arms or roller-levers are attached, it will be seen that the inking-rollers, when moved in either direction over the types, will have a positive motion, or that said rollers may be retained or allowed to remain any length of time in contact with the distributing apparatus, or in other positions not in contact with the type, by disconnecting the levers L and K when in the position represented in Fig. 3.

For disconnecting said levers I use the lever N with short arm *g*, said lever being pivoted at *f*. It will be seen in Fig. 3 that by working the lever N the short arm *g* will raise the hook M and disconnect the levers L and K. When the hook M is lifted from the stud $E^4$ the end of short arm *g* of lever N moves to a position in front of a projecting portion, *i*, of lever K, which portion acts as a stop and prevents any movement of lever K during a complete vibration of lever L. A drop-hook or latch, P, drops into connection with a mortise in the end of the short arm *g* and prevents the lever N from being worked except when the levers L and K are in juxtaposition. The latch P is relieved from the mortise in the end of short arm *g* by a projection, $t^7$, driving against a projection, $t^8$, of said latch. It will be seen that as soon as lever L moves away from lever K the latch P will fall into position and prevent the working of lever N at the wrong time, and prevent dropping of hook-connection M. Upon the pins, trunnions, or journals I, Figs. 10, 11, 12, and 13, which sustain the force or draft of the impression, I place curved wedges or sleeves $i^2$ or *i*, the concave face of said wedges or sleeves being concentric with and in contact with said pins, trunnions, or journals I, said wedges or sleeves being placed between said pins, trunnions, or journals, and their journal-boxes or bearings. The convex or outside face of wedge or sleeve is concentric with and in contact with a part or whole of said concave or inner face of said box or bearings $M^8$, the latter made either movable or stationary, in connection with the frame-work, type-bed, or platen, said frame-work, bed, or platen being constructed in any manner, whether the face of said type-bed or the plate for receiving the sheet is plane, cylindrical, segmental, or of any other construction; or whether the outside box or bearing $M^8$, either movable or stationary, is used either in connection with impression-bars, connecting-rods, draw-bars, or their equivalents, or forms a part of the same. By turning the sleeve or wedge *i* $i^2$ to different positions about the trunnion, pin, or journal I, the impression may be changed to any degree, from zero to the strongest power of the press, according as the positions of said trunnion, pin, or journal is thus changed with respect to the box or bearing $M^8$. As the surface of pin or journal I and concave face of wedge or sleeve $i^2$ $i$ are concentric with each other, and the outside face of said wedge or sleeve and the face of the box or bearing are concentric with each other, said outside faces of said wedge or sleeve being only slightly eccentric with each other, it will be seen, by referring to Figs. 11 and 12, that the tendency of the wedge or sleeve to turn under draft or pressure when set in any position is very slight.

In Fig. 11 the wedge $i^2$ is represented as a complete crescent, and in Fig. 12 it is increased to a sleeve. It will be seen that when under pressure or draft one-half of said sleeve or wedge tends to move in one direction and the other half in an opposite direction, as shown by the direction of the arrows in Figs. 11 and 12. As but little difference in the positions of said wedge or sleeve is necessary for any change required in impression, the variation between the tendencies to turn in either direction will be slight and more than overcome by the friction of the surfaces under pressure or draft. No device, therefore, is necessary for holding the wedge or sleeve in position while under pressure or draft. Some device, as projection X, however, is necessary for moving and setting said wedge or sleeve to the degree of impression required, and where two or more of said wedges or sleeves act in unison some device is required for connecting them together. In the latter case I use the connecting-bar T, Fig. 14, or an equivalent. As the friction of the bearing surfaces in Figs. 11 and 12 more than overcomes the tendency of the crescent $i^2$ to turn under pressure or draft the position of the crescent cannot be changed when desired with ease when any great amount of pressure or draft remains continuous. In such a case I cut one limb of the crescent away more or less, thus destroying the equipoise of the two limbs, as shown in Fig. 10; or cut one limb of the crescent entirely away, forming the curved wedge $i^2$ of Fig. 13. In order that the movement of the platen or cylinder in adjusting the impression may be in a direct line at right angles with the plane of the face of the types, the bearing $M^8$ is allowed free movement to either side of said line. The bearing made thus movable prevents variation of the platen or cylinder from the aforesaid direct line, thus insuring the same relative position of the print on every sheet, and securing register when sheets are printed on both sides.

In that part of the press $A^2$, Fig. 7, which contains or supports the pin, trunnions, or journals with which said wedge or sleeve comes in contact, I place a conical-headed screw, the head of which forms a V-shaped catch, $L^2$, for the catch-hook W, in whatever position the screw $L^2$ may be turned. In Fig. 1, X represents a projection upon the sleeve or wedge $i$ $i^2$, and T a bar connecting two or more wedges or sleeves when more than one are required.

Upon the projection X or bar T is a handle of the following construction: Through the socket U passes a rod with a ball or handle, V. Upon said rod is a socket-spring, $a$, Fig. 8, and attached to the end of the rod opposite handle V is the catch-hook W. By pressing upon the ball or handle V the hook W will be released from the catch $L^2$, and the wedge or sleeve $i$ $i^2$, Figs. 1 and 14, may be turned at will to any position within the scope of its movement.

To set the impression to any particular degree desired it will only be necessary to move the cone $L^2$ by turning the screw to which it is attached out or further into the supporting part $A^2$ and bringing the hook W and cone $L^2$ into connection. This will vary the position of bar T or projection X and thus vary the position of wedge or sleeve $i$ $i^2$, Figs. 1 and 14.

The manner of working the ink-fountain and vibrating feed-roller is represented in Fig. 6. The crooked lever $V^3$ works the pawl $V'$ by contact with a cam, $V^5$, on the crank-wheel F. The ink is fed from the fountain-roller $n^2$ onto the vibrating roller $V^6$ while rollers $n^2$ and $V^6$ are in contact, such feeding being effected by the working of the pawl $V^3$ and ratchet $n^1$; and the same movement of said pawl being continued, forces the vibrating feed-roller $V^6$ against the distributing-cylinder 4, said pawl pressing against the vibrating yoke $V^2$. This requires but one movement for feeding the ink from the fountain onto the vibrating feed-roller, and also for working the vibrating feed-roller to and from the distributing-cylinder.

The construction of the bed B is shown in Fig. 15, showing an end view; a longitudinal plane section; a perspective of the bed, with part of the face cut away. The face of the bed is represented by B; the longitudinal partitions are represented by $l'$; and the transverse partitions by $l''$. The core-prints or vent-holes, made in casting, are represented by $F^4$ and $F^5$. The bed is so constructed as to form a succession of internal chambers, separated by partitions, the sides of which bed converge to a common bearing and unite with the partitions in sustaining the pressure that may be applied to any part of the face of the bed. By this construction such a disposition is made of the material as to bring every particle of metal in the partitions and sides of the bed directly in line between the points of pressure and line of resistance; therefore no yield can be possible under any pressure that is supportable by iron.

The bed constructed as above described may be made, together with the supporting framework, in one piece. In such case said framework will form the end braces $l''$, the bed still remaining a hollow-chambered shell, the core-prints making the openings or vent-holes $F^4$ $F^5$ through the sides of the supporting frame-work in those parts which form the end braces.

Figure 17:
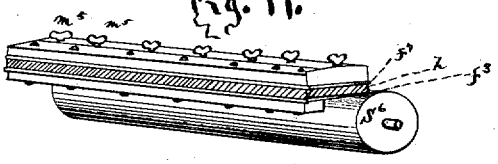
Figure 18:
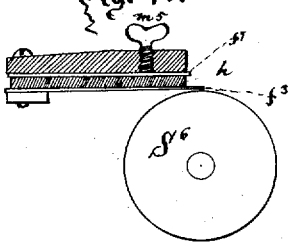

In applying material to the ink-fountain gauge to prevent the binding of the knife or cut-off $f^3$, Fig. 17, on the ink-feed roller $S^6$, Fig. 17, I use the following method, as one of the most convenient in manufacturing and durable for use: I place a piece or pieces of rubber packing or other elastic material, $h$, upon the knife or cut-off $f^3$, said material being removed far enough from the edge of said knife as to avoid contact with the ink. I then place upon this elastic material a thin bearing-plate or slips, $f^7$, to receive the direct pressure of the set-screws $m^5$. The pressure of said set-screws is conveyed indirectly to the cut-off $f^3$, but prevented from being a positive irresistible pressure by the intermediate elastic material $h$, so that the flow of ink can be entirely cut off on any part of the length of the roller $S^6$ without binding or setting said roller. The gauge thus constructed is made movable, so that it may be cleaned separately from the roller $S^6$.

The holes $u$ $u$, Fig. 16, in the frisket-finger are made large enough for small feed-guides to be placed under them on the tympan-sheet. These holes have two prominent advantages over notches cut into the side of the finger—first, the finger is much stronger, having material left on all sides of the hole; and second, the entire edges of the finger are left for clamping the sheet, holding it in place more firmly; also preventing tearing or wearing frail sheets by contact with the corners made by notching the finger. The hole is made of a size to admit only a small guide, so that the part of the finger between the hole and the printed matter may be made very narrow in order that the entire edge of the sheet may be griped by the finger while printing a sheet with a very narrow margin, in this respect differing entirely from a slotted griper for movable guides.

S, Figs. 1 and 5, is the lug, placed on the lever-projection of the platen-support or rocker R, which draws upon the upper face of the flange Y, while projection $S^1$ draws upon the under face of said flange for the purpose of firmly holding the platen in position during the time for taking the impression.

The bed B, Figs. 1 and 2, is made to incline backward at any angle between forty-five degrees and the vertical in order that the type may rest upon the face of said bed by its own gravity, preventing the loose type from working out of the form and the latter from "bagging."

I am aware that an inclined bed has been used in connection with a cylinder by G. P Gordon, and also in connection with a reciprocating platen, inclined parallel to the bed, by P. W. Latcher.

Heretofore the general construction of presses has precluded the use of a bed inclined backward, at the same time with a vibrating, oscillating, or rocking platen, on account of the necessarily-extended sweep of the platen. By constructing a platen of the general nature of the one here shown the sweep is materially shortened, thus allowing the use of such a bed.

Having thus described my invention, what I claim as new, and desire to secure by Letters Patent, is—

1. In a printing-press, such a construction of the ways, in or on which the wheels or guides of the inking-rollers run, as shall raise such inking-rollers free from the distributing-cylinder or cylinders when approaching or leaving the same, substantially as and for the purpose described.

2. The traverse-cam C, whether attached to crank-pin as a cap or forming part of the crank-wheel, when used in connection with the stud or pulley G, for the purpose set forth.

3. The mechanism described, or its equivalent, for imparting to the inking-rollers a positive motion in both directions over the form, combined with the mechanism or its equivalent for stopping the inking-rollers at the will of the operator without stopping the press.

4. The positively-moving lever L and lever K and connection M, combined for the purpose of giving motion to the inking-rollers, substantially as described.

5. The lever N $g$, combined with the connection M, for the purpose of disconnecting the levers L K, substantially as explained.

6. The mechanism described or its equivalent for stopping the inking-rollers, combined with the mechanism or its equivalent for preventing the inking-rollers from being set in motion at an improper time.

7. The latch P, combined with the levers L K, for the purpose of holding lever K and hook-connection M in position for reconnection and preventing the release of lever N at an improper time, substantially as specified.

8. A curved wedge or sleeve, $i$ $i^2$, combined with the freely-moving bearing $M^8$, which sustains the force of the impression, and so arranged that the said wedge or sleeve may be set in different positions to produce varying degrees of impression, substantially as set forth.

9. The wedge or sleeve $i$ $i^2$, combined, as described, with the adjusting-bar T.

10. The set-latch $L^2$ W, combined with a handle, V, as and for the object explained.

11. In combination with such set-latch, the projection X or bar T of the wedge or sleeve $i$ $i^2$, as and for the end specified.

12. The use of rubber packing or other elastic material for the purpose of relieving the cut-off of the ink-fountain from the direct pressure of the set-screws, substantially as set forth.

13. The additional lug S placed on the lever-projection of support R, in combination with the flange Y, as and for the purpose described.

14. The type-bed B, inclined backward at any angle between the vertical and forty-five degrees, in combination with the vibrating, rocking, or oscillating platen A, constructed substantially as herein set forth.

15. A hollow bed, divided into chambers by means of internal partitions, substantially as described.

16. A frisket-finger provided with a hole or holes, $u$, substantially as and for the purpose specified.

MERRITT GALLY.

Witnesses:
L. C. McNeal,
E. D. Thomas.

(117)